United States Patent [19]

McDonald

[11] Patent Number: 4,989,971
[45] Date of Patent: Feb. 5, 1991

[54] AUTOMATIC MASK TRIGGER FOR AN OPTICAL TIME DOMAIN REFLECTOMETER

[75] Inventor: Kevin B. McDonald, Bend, Oreg.

[73] Assignee: Tektronix, Inc., Beaverton, Oreg.

[21] Appl. No.: 379,852

[22] Filed: Jul. 14, 1989

[51] Int. Cl.⁵ ..................... G01N 21/01; G01N 21/88
[52] U.S. Cl. .................................................. 356/73.1
[58] Field of Search ............... 356/73.1; 350/355, 356, 350/357; 250/354.1

[56] References Cited

U.S. PATENT DOCUMENTS

| | | | |
|---|---|---|---|
| H686 | 10/1989 | Mullins | 350/355 |
| 4,173,412 | 11/1979 | Ramsay et al. | 356/73.1 |
| 4,543,477 | 9/1985 | Doi et al. | 356/73.1 |
| 4,730,113 | 3/1988 | Edwards et al. | 250/354.1 |

Primary Examiner—Vincent P. McGraw
Assistant Examiner—La Charles P. Keesee
Attorney, Agent, or Firm—Francis I. Gray

[57] ABSTRACT

An automatic trigger mask for an optical time domain reflectometer inhibits high optical level pulses in a received optical signal from saturating an optical detector in a receiver. A portion of the received optical signal is compared with a threshold signal derived from the output of the receiver. If the portion of the received optical signal exceeds the threshold signal, then a control signal is generated to open an optical switch in the optical path to the receiver so that the high optical level pulses are inhibited from reaching the optical detector.

7 Claims, 1 Drawing Sheet

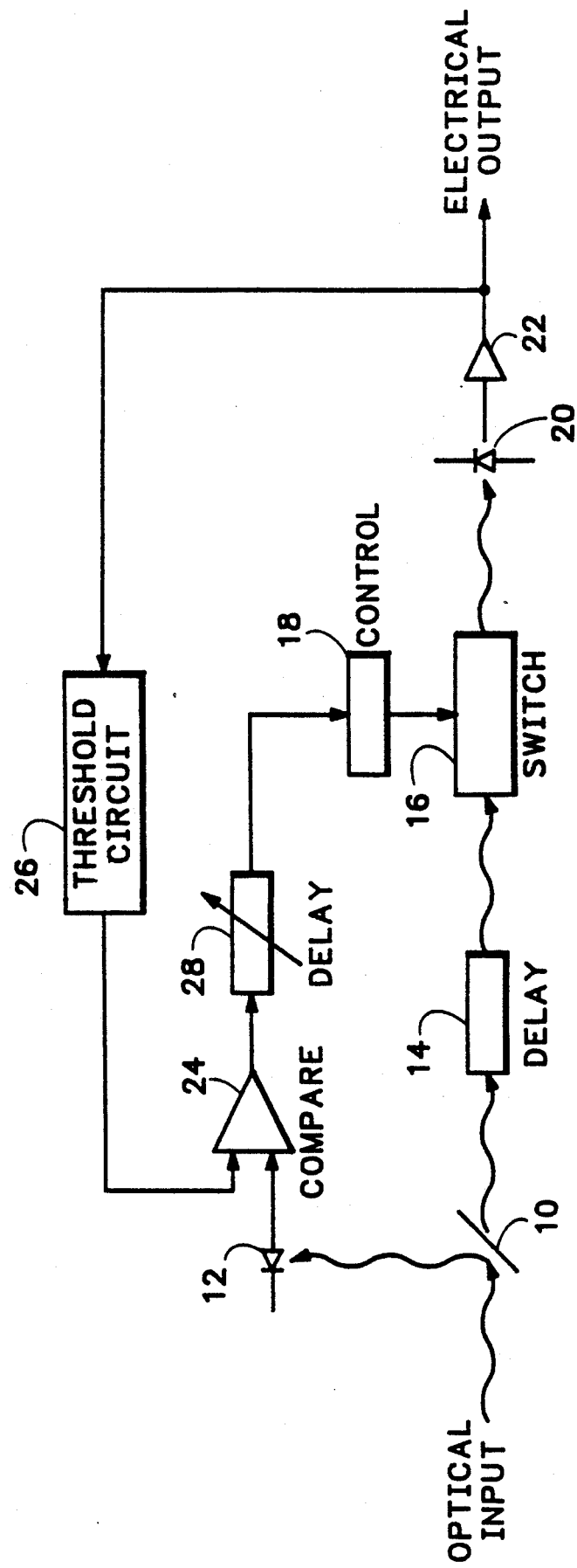

AUTOMATIC MASK TRIGGER FOR AN OPTICAL TIME DOMAIN REFLECTOMETER

BACKGROUND OF THE INVENTION

The present invention relates to switching of optical signals, and more particularly to an automatic mask trigger for an optical time domain reflectometer that opens an optical switch when an input optical signal exceeds an automatically determined threshold level.

In an optical time domain reflectometer a received optical signal from a fiber optic cable under test is input to an optical detector that converts the received optical signal into an electrical signal. The electrical signal is subsequently sampled, processed, stored and displayed. From the display of the processed electrical signal a picture of the fiber optic cable characteristics is determined, including loss per unit distance, splice losses that cause reflections, and other reflectionless loss locations. Due to the low level of the received optical signal, the sensitivity of the optical detector is relatively great. As a result a large return on the received optical signal may saturate the optical detector so that for a period of time, corresponding to up to four hundred meters of the fiber optic cable length, the electrical signal is saturated and no cable characteristics during that interval can be determined.

To compensate for this response to high level received optical signals a method is described in U.S. Pat. No. 4,769,534 issued Sept. 6, 1988 to Donald L. Brand entitled "Optical Detector with Storage Effects Reduction." An optical switch is interposed between the received optical signal and the optical detector to mask the high level received optical signals from being passed to the optical detector during non-sampling intervals. The optical switch is controlled so that the switch closes only when the received optical signal is to be sampled. The method is automatic, but requires that samples be taken at sufficient intervals that the optical detector is allowed to recover from high level signals.

Another method is manual in nature in that it requires the operator to observe an initial acquisition of data, and then via a cursor or other means to signal the optical switch to turn off at high level times. Thus the high level optical signal is not input to the optical detector, preventing the saturation of the detector and reducing the period when the cable is uncharacterized. However the optical detector is saturated by high level optical returns for the initial data acquisition to determine where the received optical signal has high level pulses that need to be masked.

What is desired is an automatic masking trigger for an optical time domain reflectometer that prevents the saturation of an optical detector and rapidly opens an optical switch only during the time when an optical input signal exceeds a predetermined level to reduce the period of time when a fiber optic cable is uncharacterized.

SUMMARY OF THE INVENTION

Accordingly the present invention provides an automatic mask trigger for an optical time domain reflectometer that uses a portion of an input optical signal to generate a test electrical signal. The input optical signal is delayed prior to input to an optical switch. The output from the optical switch is detected to produce an electrical signal, a portion of which is fed back to a comparator as a threshold electrical signal. When the test electrical signal, also input to the comparator, exceeds the threshold electrical signal due to the receipt of a high level pulse in the input optical signal, a control signal is generated that causes the optical switch to open so that the high level pulse is not passed through to the optical detector. An electrical delay may be placed in the control signal path to synchronize the control signal with the input optical signal at the optical switch.

The objects, advantages and other novel features of the present invention are apparent from the following detailed description when read in conjunction with the appended claims and attached drawing.

BRIEF DESCRIPTION OF THE DRAWING

The Figure is a block diagram of an automatic trigger mask for an optical time domain reflectometer according to the present invention.

DESCRIPTION OF THE PREFERRED EMBODIMENT

Referring now to the Figure a received optical signal from a fiber optic cable under test is input to a beam splitter 10 where a small portion of the optical energy of the received optical signal is diverted to a first optical detector 12. The amount of the received optical signal diverted to the first optical detector 12 by the beam splitter 10 is not more than ten percent, and preferably less than five percent. Most of the optical energy of the received optical signal is passed by the beam splitter 10 to an optical delay line 14 that delays the received optical signal. The delayed received optical signal is then input to a high speed optical switch 16, such as a lithium niobate (LiNbO$_3$) optical switch. The optical switch 16 is controlled by a control circuit 18 to be either open, to inhibit passage of the delayed received optical signal through the optical switch, or closed, to pass the delayed received optical signal through the optical switch. The optical signal output from the optical switch 16 is input to a second optical detector 20 that converts the optical signal to an electrical signal. A receiver amplifier 22 amplifies the electrical signal before sampling and further processing.

A portion of the electrical signal from the receiver amplifier 22 is input as a threshold electrical signal to a comparator 24 via a threshold circuit 26. The test electrical signal from the first optical detector 12 is compared with the threshold electrical signal in the comparator 24 to produce a control signal when the test electrical signal exceeds the threshold electrical signal. The control signal is input to the optical switch control circuit 18 to open the optical switch 16 in response to the control signal. A variable electrical delay circuit 28 is inserted into the control signal path between the comparator 24 and the control circuit 18 to synchronize the control signal with the delayed received optical signal at the optical switch. The variable electrical delay circuit 28 allows the optical delay 14, which is generally a length of fiber optic cable, to be made with greater tolerances to reduce manufacturing costs, with any variations between optical delay devices 14 being compensated for by adjustment of the variable electrical delay circuit 28. The control signal opens the optical switch 16 at the start of the high level pulse within the delayed received optical signal that generated the control signal, and closes the optical switch as soon as the high level pulse is over. The result is to limit the amount of information about the cable that is lost to a matter of centimeters of length as opposed to meters.

Thus the present invention provides an automatic mask trigger for an optical time domain reflectometer that compares a portion of an input optical signal with a threshold signal derived from an electrical output signal corresponding to the input optical signal. The input optical signal is delayed by a slight amount so that when a high level pulse occurs in the input optical signal, a control signal is generated that opens an optical switch to inhibit the high level pulse from passing through to an optical detector, thus avoiding saturation of the optical detector. This technique allows the use of high speed analog to digital converters to acquire samples at closely spaced time or distance intervals to provide more data quickly for fast averaging.

What is claimed is:

1. An improved optical time domain reflectometer of the type having an optical switch to which an optical signal in the form of return reflected light from a fiber under test is input, means for controlling the optical switch in response to a control signal, and means for converting the optical signal from the optical switch into an electrical signal, the improvement comprising:

means for automatically generating the control signal as a function of a current optical input level of the optical signal for the optical switch and the electrical signal so that the optical switch is turned off when the current optical level exceeds a threshold electrical signal determined by the electrical signal to inhibit the optical signal from being passed through the optical switch.

2. An improved optical time domain reflectometer as recited in claim 1 wherein the generating means comprises:

means for generating the threshold electrical signal from the electrical signal; and means for comparing the threshold electrical signal with the current optical input level to produce the control signal.

3. An improved optical time domain reflectometer as recited in claim 2 wherein the comparing means comprises:

means for converting a portion of the current optical input level to a test electrical signal; and means for comparing the test electrical signal with the threshold electrical signal to produce the control signal when the test electrical signal exceeds the threshold electrical signal.

4. An improved optical time domain reflectometer as recited in claim 2, wherein the control signal generating means further comprises means for delaying the optical signal at the input of the optical switch so that the optical signal is in synchronization with the control signal at the optical switch.

5. An improved optical time domain reflectometer as recited in claim 4 further comprising means for delaying the control signal to compensate for variations in the optical signal delaying means so that the control signal is in synchronization with the optical signal at the optical switch.

6. An automatic mask trigger for an optical time domain reflectometer having an optical signal input in the form of return reflected light from a fiber under test comprising:

means for converting a portion of the optical signal input to a test electrical signal;

means for delaying the remainder of the optical signal input;

an optical switch to which the delayed optical signal input from the delaying means in input;

means for converting the output from the optical switch to an electrical signal;

means for generating a threshold electrical signal from the electrical signal;

means for comparing the test electrical signal and the threshold electrical signal to generate a control signal when the test electrical signal exceeds the threshold electrical signal; and means for controlling the optical switch in response to the control signal so as to open the optical switch when the test electrical signal exceeds the threshold electrical signal to prevent high optical level pulses from being passed by the optical switch to saturate the optical switch output converting means.

7. An automatic mask trigger as recited in claim 6 further comprising means for delaying the control signal to compensate for variations in the optical signal delaying means so the optical signal input to the optical switch is synchronized with the control signal.

* * * * *